US008956047B2

(12) United States Patent
Tanaka

(10) Patent No.: US 8,956,047 B2
(45) Date of Patent: Feb. 17, 2015

(54) LINEAR GUIDE BEARING DEVICE AND SEAL MEMBER USED FOR THE SAME

(75) Inventor: Keisuke Tanaka, Maebashi (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 13/885,062

(22) PCT Filed: Oct. 19, 2011

(86) PCT No.: PCT/JP2011/005847
§ 371 (c)(1), (2), (4) Date: May 13, 2013

(87) PCT Pub. No.: WO2012/066729
PCT Pub. Date: May 24, 2012

(65) Prior Publication Data

US 2013/0223771 A1 Aug. 29, 2013

(30) Foreign Application Priority Data

Nov. 18, 2010 (JP) ................................ 2010-257888

(51) Int. Cl.
*F16C 33/00* (2006.01)
*F16J 15/00* (2006.01)
(Continued)

(52) U.S. Cl.
CPC ........... *F16C 29/086* (2013.01); *F16C 29/0633* (2013.01); *F16C 33/76* (2013.01); *F16C 41/008* (2013.01)
USPC ............................................ 384/15; 277/349

(58) Field of Classification Search
CPC .... F16C 29/089; F16C 33/76; F16C 29/0633; F16C 41/008
USPC ................................ 384/15, 43–45; 277/349
See application file for complete search history.

(56) References Cited

U.S. PATENT DOCUMENTS 5,492,413 A * 2/1996 Tsukada ......................... 384/15
7,740,406 B2 * 6/2010 Kakei ............................ 384/15
(Continued)

FOREIGN PATENT DOCUMENTS

JP 2003-314548 A 11/2003
JP 2004-316762 A 11/2004
(Continued)

OTHER PUBLICATIONS

International Preliminary Report on Patentability (PCT/IB/338 & PCT/IB/373) dated Jun. 12, 2013, including English translation of Document C2 (Japanese-language Written Opinion (PCT/ISA/237)) previously filed on May 13, 2013 {Six (6) Pages}.
(Continued)

*Primary Examiner* — Alan B Waits
(74) *Attorney, Agent, or Firm* — Crowell & Moring LLP

(57) ABSTRACT

There is provided a linear guide bearing device, and a seal member used for the same, in which the entry of foreign matter to the inside the slider and leakage of lubricant from the inside of the slider are prevented and the manufacturing costs are reduced. For this end, a linear guide bearing device 1 is configured with multiple seal members (31, 32, 33) arranged in an axial direction of a slider (20) are provided at end portions of a slider (20) so as to slide against rolling element rolling grooves (11) of a guide rail (10). The multiple seal members (31, 32, 33) are provided with: seal main bodies (31*a*, 32*a*, 33*a*) respectively having lip parts (31*b*, 32*b*, 33*b*) sliding against the rolling element rolling grooves (11); and reinforcing members (31*c*, 32*c*, 33*c*) arranged on both daces of the seal main bodies (31*a*, 32*a*, 33*a*), respectively.

4 Claims, 6 Drawing Sheets

30
20
31 32 33
20b
20a
20b
30
33 32 31
10
31b
33b
32b
33b
31b
32b

(51) Int. Cl.

| | |
|---|---|
| ***F16C 29/08*** | (2006.01) |
| ***F16C 29/06*** | (2006.01) |
| ***F16C 33/76*** | (2006.01) |
| ***F16C 41/00*** | (2006.01) |

(56) References Cited

U.S. PATENT DOCUMENTS

| | | | | |
|---|---|---|---|---|
| 7,789,564 | B2 * | 9/2010 | Keller et al. | 384/15 |
| 8,033,729 | B2 * | 10/2011 | Michioka et al. | 384/15 |
| 2003/0059134 | A1 * | 3/2003 | Mochizuki et al. | 384/15 |
| 2007/0242906 | A1 * | 10/2007 | Kakei | 384/15 |
| 2008/0131037 | A1 * | 6/2008 | Keller et al. | 384/15 |
| 2009/0148083 | A1 * | 6/2009 | Michioka et al. | 384/15 |
| 2013/0216160 | A1 * | 8/2013 | Ooga | 384/15 |
| 2013/0223771 | A1 * | 8/2013 | Tanaka | 384/15 |
| 2013/0243355 | A1 * | 9/2013 | Kawakami | 384/15 |
| 2013/0308886 | A1 * | 11/2013 | Okaji et al. | 384/485 |
| 2013/0343680 | A1 * | 12/2013 | Nishiyama | 384/15 |

FOREIGN PATENT DOCUMENTS

| | | | |
|---|---|---|---|
| JP | 2005-337407 | A | 12/2005 |
| JP | 2006-2788 | A | 1/2006 |
| JP | 2007-211821 | A | 8/2007 |
| JP | 2008-163978 | A | 7/2008 |
| JP | 2009-121648 | A | 6/2009 |
| JP | 2010-60120 | A | 3/2010 |

OTHER PUBLICATIONS

Corresponding International Search Report with English Translation dated Nov. 15, 2011 (four (4) pages).

Japanese-language Written Opinion dated Nov. 15, 2011 (PCT/ISA/237) (three (3) pages).

Chinese Office Action dated Feb. 7, 2014 with English translation (twelve (12) pages).

Chinese Office Action dated Aug. 11, 2014 with English Translation (eight (8) pages).

Japanese Office Action dated May 27, 2014 with English Translation (six (6) pages).

* cited by examiner

LINEAR GUIDE BEARING DEVICE AND SEAL MEMBER USED FOR THE SAME

TECHNICAL FIELD

The present invention relates to a linear guide bearing device suitable for use, for example, in a mechanical apparatus like a machine tool where swarf or other foreign matters are produced in the surroundings, and relates to a seal member used for the same.

BACKGROUND ART

As a conventional general linear guide device, for example, the one shown in FIG. 8 is known.

As shown in FIG. 8, this linear guide bearing device is provided with a guide rail 101 which extends in the axial direction and a slider 102 which straddles the guide rail 101 in a manner able to move relatively to it in the axial direction.

The two side surfaces of the guide rail 101 are formed with rolling element rolling grooves 103 which extend in the axial direction. The slider body 102A of the slider 102 is formed at the inside surfaces of two sleeve parts 104 with rolling element rolling grooves 107 which face the rolling element rolling grooves 103. Further, between each two facing rolling element rolling grooves 103 and 107, as one example of the rolling elements, a large number of balls B are rollably loaded. Through rolling of these balls B, the slider 102 can move relative to the guide rail 101 on it in the axial direction.

Along with this movement, the balls B interposed between the guide rail 101 and slider 102 roll and move to the end parts of the slider 102, but to continuously make the slider 102 move in the axial direction, these balls B have to be endlessly circulated.

For this reason, the sleeve parts 104 of the slider body 102A are formed inside them with rolling element passages 108 which run through the axial direction, and the two ends of the slider body 102A are fastened with substantially U-shaped end caps 105 through for example screws 112 or other fastening means. The end caps 105 are formed with direction changing channels 106 bent in semi-arcuate shapes connecting the two rolling element rolling grooves 103 and 107 and the rolling element passages 108, whereby rolling element endless circulation raceways are formed. Note that, in FIG. 8, reference numeral ill indicates a side seal member (rubber seal material) fastened together with the end cap 105 to an end face of the slider body 102A via screws 112 etc., 110 indicates a tap hole for a screw 112 formed at an end face of the slider body 102A, 113 indicates a greasing nipple, and 114 indicates a bolt hole for fastening the guide rail 101.

Each side seal 111, like the end cap 105, is made a substantial U-shape and has an inner circumference which is made a sealing surface which slides against the guide rail 101. It is formed from a steel sheet on which rubber is bonded by baking.

In this regard, in a linear guide bearing device used for a mechanical apparatus such as a machine tool wherein swarf or other foreign matter is produced in the surroundings, the seal by the above-mentioned side seal member 111 alone is not sufficient and the lubrication conditions also become tougher, so in the past, as shown in FIG. 9, it has been proposed to arrange a plurality of lubricant feed members 115 between the side seal member 111 for preventing small foreign matter from entering inside of the slider 102 and the end cap 105 in the axial direction of the slider 102 and to attach to the outside surface and inside surface sides of the side seal member 111 in the axial direction steel protectors (hard seal members) 117 which like the end cap 105 are formed in substantially U-shapes and which remove large foreign matter or hard foreign matter.

Each lubricant feed member 115 is made of a porous resin in which lubricating oil is impregnated, so like the end cap 105 is formed in a substantially U-shape, has fastening rings 116 for insertion of screws 112 fit at the outsides of the two ends of the U-shape, and is provided with sliding parts (not shown) which slide against the rolling element rolling grooves 103 of the guide rail 101 to feed lubricant at the insides of the two ends of the U-shape.

In the above conventional linear guide bearing device, the side seal member 111 and lubricant feed members 115 are not complete in sealing ability and are insufficient as seals. Further, when arranging a plurality of lubricant feed members 115 in the axial direction of the slider 102, if the facing surfaces of the lubricant feed members 115 which adjoin each other in the axial direction are pressed together, the contact pressure of the sliding parts against the rolling element rolling grooves 103 of the guide rail 101 becomes weaker. This sometimes causes the problem of the rolling element rolling grooves 103 not being sufficiently supplied with lubricant. Further, the lengths of the fastening rings 116 in the axial direction are made longer than the thicknesses of the lubricant feed members 115 in the axial direction to provide clearances C between the lubricant feed members 115, so there is a possibility of swarf and other foreign matter which built up at the clearances C entering inside of the slider 102 and causing early wear or breakage.

Therefore, as shown in FIG. 10, a linear guide bearing device has been proposed which prevents the entry of foreign matter to the inside of the slider so as to prevent early wear and breakage (see Patent Document 1).

The linear guide bearing device described in Patent Document 1 includes, at each end part of the slider (in actuality, the end cap), lubricant feed members 115 and a plurality of seals with different seal performances in that order. The plurality of seals with different seal performances include soft seal members constituted by the rubber seal material 111, resin seal material 120, and felt seal 121 and hard seal members constituted by protectors 117 as illustrated.

Further, a linear guide device has also been proposed which, to seal the clearance formed between the guide rail and the slider, is provided with an under seal includes a plurality of seal plates stacked in a height direction of the guide rail (see Patent Document 2).

The linear guide device described in Patent Document 2, as shown in FIG. 11, seals the clearance 222 formed between the side surface parts 202*a* of the guide rail 202 and the inside side surface parts 204*a* of the slider 204 by the provision of an under seal 224 made of a plurality of seal plates 228 stacked in the height direction of the guide rail 202.

PRIOR ART DOCUMENTS

Patent Documents

Patent Document 1: JP 2005-337407 A
Patent Document 2: JP 2007-211821 A

SUMMARY OF THE INVENTION

Problem to be Solved

However, the linear guide (bearing) devices which are described in Patent Document 1 and Patent Document 2 use soft seal materials which different in hardness so as to adjust the sealing ability, so to obtain the targeted sealing ability, it is necessary to suitably adjust the materials when preparing the devices. Therefore, this is liable to invite an increase in the manufacturing costs.

Further, the linear guide (bearing) devices which are described in Patent Document 1 and Patent Document 2 are only described as if preventing the entry of foreign matter from the outside. Prevention of leakage of lubricant at the inside is not considered.

Furthermore, the conventional seal member is fabricated in the state with the lip part bent in a predetermined direction with respect to the surface for attachment to the slider (end cap). For this reason, when attaching the conventional seal member to a linear guide bearing device, it is necessary to prepare a seal member of a structure designed to prevent entry of foreign matter, prevent leakage of lubricant, etc. each time. This invited an increase in costs.

Therefore, the present invention has been made in consideration of the above problems and has as its object the provision of a linear guide bearing device which prevents entry of foreign matter to the inside of the slider and leakage of lubricant from the inside of the slider and which reduces the manufacturing cost.

Further, another object of the present invention is to provide a seal member which enhances the degree of freedom of direction of the lip part when attaching the seal member to a linear guide bearing device.

Solution to the Problem

To achieve the above objects, according to an aspect of the present invention, there is provided a seal member attached to an end part of a slider in an axial direction, the slider having rolling element rolling grooves which face rolling element rolling grooves of a guide rail which has rolling element grooves extending in the axial direction and straddling the guide rail to be capable of relatively moving in the axial direction through a rolling action of a large number of rolling elements inserted between the respective both of the rolling element rolling grooves, the seal member comprising: a seal body provided with a lip part which slides against the rolling element rolling grooves of the guide rail; and reinforcing members provided at both sides of the seal body.

Since, in this way, the seal member is configured to include a seal body which is provided with a lip part and with reinforcing members which are provided so as to sandwich the seal body between them, by just turning the seal member around, the seal member can be freely changed in the direction of the projecting part of the lip part. Therefore, it is possible to provide a seal member which increases the degree of freedom of the direction of a lip part when attaching the seal member to a linear guide bearing device.

According to another aspect of the present invention, there is provided a linear guide bearing device which comprises:

a guide rail which has rolling element rolling grooves extending in an axial direction;

a slider which has rolling element rolling grooves facing the rolling element rolling grooves of the guide rail and straddling the guide rail to be capable of relatively moving in the axial direction through a rolling action of a large number of rolling elements inserted between both of the rolling element rolling grooves; and a plurality of the seal members attached to end parts of the slider in the axial direction to be superposed in the axial direction of the slider, wherein each of the plurality of seal members has a seal body provided with a lip part which slides against the rolling element rolling grooves of the guide rail and reinforcing members provided at both sides of the seal body.

Since, in this way, the seal member is configured to include a seal body which is provided with a lip part and with reinforcing members which are provided so as to sandwich the seal body between them, by just turning the seal member around, the linear guide bearing device can be freely changed in the direction of the projecting part of the lip part. As a result, there is no need to produce a seal member designed for the direction or length of the projecting part of the lip part and the variations in the methods of superposing the plurality of the seal members can be increased.

Therefore, it is possible to provide a linear guide bearing device which prevents the entry of foreign matter to the inside of the slider and leakage of the lubricant from the inside of the slider and which reduces the manufacturing cost without changing the material of the seal members.

In addition, according to yet another aspect of the present invention, projecting parts of the lip parts which project from the seal members are bent inward and lengths of the projecting parts become longer, as extending further to the outside.

In addition, according to further another aspect of the present invention, projecting parts of the lip parts which project from the seal members are bent outward and lengths of the projecting parts become shorter, as extending further to the outside.

Advantageous Effects of the Invention

According to the present invention, a plurality of seal members which differ in lengths of the projecting parts of the lip parts are provided at end parts of the slider in the axial direction, so it is possible to provide a linear guide bearing device in which the slider prevents entry of foreign matter to the inside and leakage of lubricant from the inside of the slider and thereby reduces the manufacturing cost without changing the material of the seal members.

Further, it is possible to provide a seal member which enhances the degree of freedom of direction of the lip part when attaching it to a linear guide bearing device.

DESCRIPTION OF EMBODIMENTS

Hereinafter, embodiments of a linear guide bearing device will be explained with reference to the drawings.

(First Embodiment)

Figure 1:
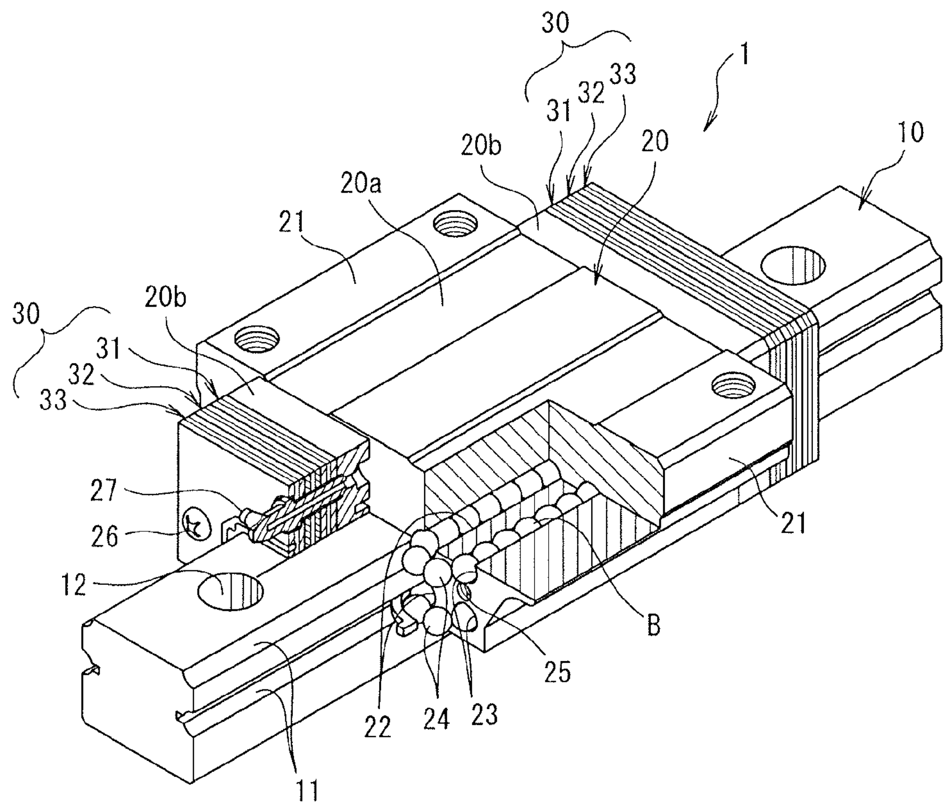
FIG. 1 is a perspective view which shows the configuration of a first embodiment of a linear guide bearing device.
Figure 2:
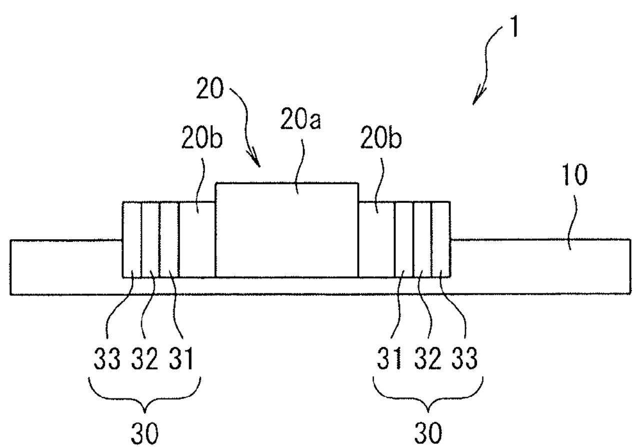
FIG. 2 is a side view which shows the configuration of the first embodiment of the linear guide bearing device.
Figure 3A:
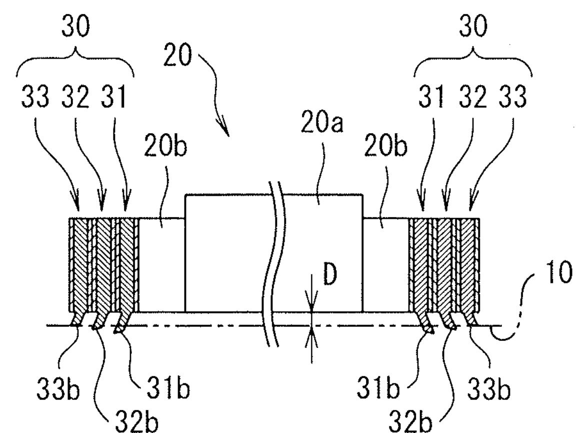
FIG. 3 is a cross-sectional view of principal parts of the configuration of the first embodiment of the linear guide bearing device.
Figure 3B:
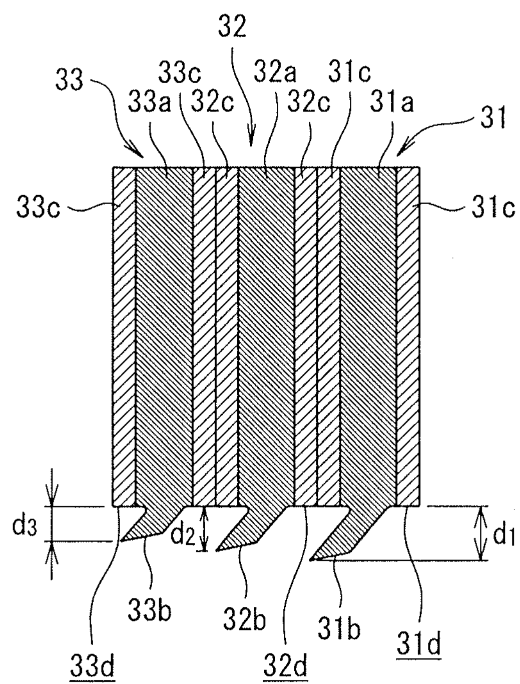
Figure 4A:
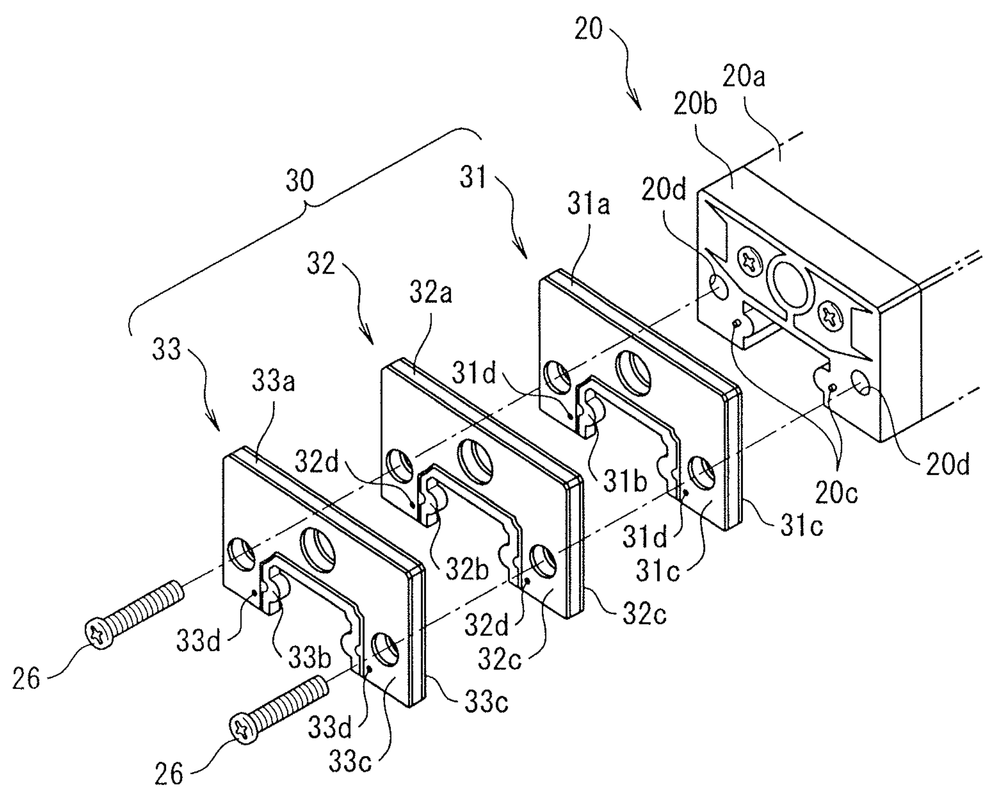
FIG. 4 is a view of principal parts in the configuration of the first embodiment of the linear guide bearing device.
Figure 4B:
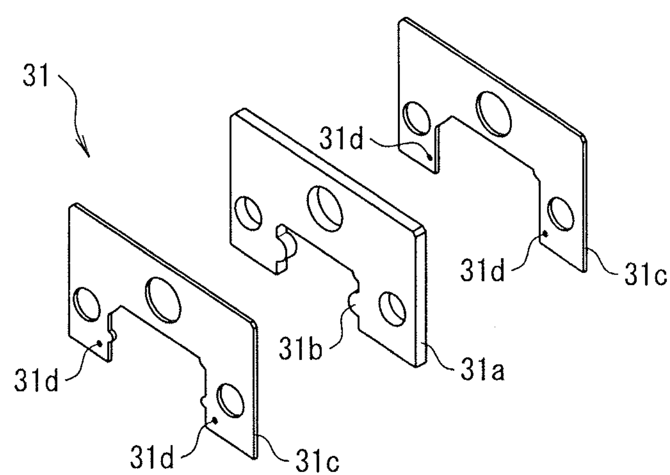

FIG. 1 is a perspective view which shows the configuration of a first embodiment of a linear guide bearing device, FIG. 2 is a side view which shows the configuration of the first embodiment of the linear guide bearing device, FIG. 3 is a cross-sectional view of principal parts of the configuration of the first embodiment of the linear guide bearing device, wherein FIG. 3A is a partial cross-sectional view of a slider and a seal member and FIG. 33 is a cross-sectional view of the seal member, and FIG. 4 is a view of principal parts in the configuration of the first embodiment of the linear guide bearing device, wherein FIG. 4A is a perspective view and FIG. 4B is a disassembled perspective view of the seal member.

As shown in FIG. 1, FIG. 2, FIG. 3A, and FIG. 4A, a linear guide bearing device 1 is provided with a guide rail 10 which extends in the axial direction and a slider 20 which straddles the guide rail 10 in a manner able to move relatively to it in the axial direction.

The two side surfaces of the guide rail 10 are formed with rolling element rolling grooves 11 which extend in the axial direction. A slider body 20A of the slider 20 is formed at the inside surfaces of two sleeve parts 21 with rolling element rolling grooves 2 which face the rolling element rolling grooves 11. Further, between each two facing rolling element rolling grooves 11 and 22, as one example of the rolling elements, a large number of balls B are rollably loaded. Through rolling of these balls B, the slider 20 can move relative to the guide rail 10 on it in the axial direction.

Along with this movement, the balls B interposed between the guide rail 10 and slider 20 roll and move to the end parts of the slider 20, but to continuously make the slider 20 move in the axial direction, these balls B have to be endlessly circulated.

For this reason, the sleeve parts 21 of the slider body 20A are formed inside them with rolling element passages 23 which run through the axial direction, and the two ends of the slider body 20A are fastened with substantially U-shaped end caps 20*b* through for example screws 26 or other fastening means. The end caps 20*b* are formed with direction changing channels 24 bent in semi-arcuate shapes connecting the two rolling element rolling grooves 11 and 22 and the rolling element passages 23, whereby rolling element endless circulation raceways are formed.

Further, at each of the two ends of the slider 20 in the axial direction are fastened a first seal member 31, a second seal member 32 attached to an outer surface side of the first seal member 31, and a third seal member 33 attached to an outer surface side of the second seal member 32, in this order. The seal members 31, 32, and 33 respectively have lip parts 31*b*, 32*b*, and 33*b* which slide against the rolling element rolling grooves 11 of the guide rail 10 (see FIG. 3 and FIG. 4) . In the present embodiment, the seal members 31, 32, and 33 are superposed and attached to the two ends of the slider 20 in the axial direction so that the front ends of the lip parts 31*b*, 32*b*, and 33*b* are made to face outward. Here, "outward" indicates a direction away from the slider body 20*a*.

Note that, between at least some of the first seal member 31, the second seal member 32, and the third seal member 33, at least one lubricant feed member (not shown) formed from a porous resin material which contains a lubricant and which slides against the rolling element rolling grooves 11 to feed the lubricant may be provided. As an example of such a lubricant feed member, the "lubricant feeder" described in JP 2004-340362 A may be mentioned. By providing lubricant feed members together with the seal member 30, it is possible to form a rust preventing film made of a lubricant which provides a rust preventing effect at the guide rail 10, have the seal member positioned outward among the plurality of the seal members 31, 32, and 33 (third seal member 33) protect the rust preventing film while blocking entry of foreign matter of a predetermined size or more, and have the seal member positioned at the inside (first seal member 31) block entry of foreign matter which has slipped through the third seal member 33 and the second seal member 32.

Further, in the present embodiment, each seal member 30 is made of the three members of the first seal member 31, the second seal member 32, and the third seal member 33, but the number of the seal members superposed is suitably selected in accordance with the object of prevention of entry of foreign matter.

Here, in FIG. 1, reference numeral 25 indicates a tap hole for a screw 26 formed at an end face of the slider body 20A, reference numeral 27 indicates a greasing nipple, and reference numeral 12 indicates a bolt hole for fastening the guide rail 10.

(Seal Member)

As shown in FIG. 1, FIG. 2, and FIG. 3A, the first seal member 31, the second seal member 32, and the third seal member 33 are superposed to form the seal member 30 and are attached to the end part of the slider 20 in the axial direction through screws 26.

Further, as shown in FIG. 33, the first seal member 31 includes a seal body 31*a* and reinforcing members 31*c* and 31*c* placed at the front surface and the back surface of the seal body 31*a* so as to sandwich the seal body 31*a*. The normal directions of the front surface and the back surface of the seal body 31*a* which is sandwiched between the reinforcing members 31*c* and 31*c* are directions in which the second seal member 32 and the third seal member 33 are superposed with the first seal member 31. One end of the side face of the seal body 31*a* is formed with a lip part 31*b* so as to project from the reinforcing members 31*c* and 31*c*.

In the same way, the second seal member 32 also includes a seal body 32*a* and reinforcing members 32*c* and 32*c* placed at the front surface and the back surface of the seal body 32*a* so as to sandwich the seal body 32*a*. The normal directions of the front surface and the back surface of the seal body 32*a* which is sandwiched between the reinforcing members 32*c* and 32*c* are directions in which the first seal member 31 and the third seal member 33 are superposed with the second seal member 32. One end of the side face of the seal body 32*a* is formed with a lip part 32*b* so as to project from the reinforcing members 32*c* and 32*c*.

Further, the third seal member 33 also includes a seal body 33*a* and reinforcing members 33*c* and 33*c* placed at the front surface and the back surface of the seal body 33*a* so as to sandwich the seal body 33*a*. The normal directions of the front surface and the back surface of the seal body 33*a* which is sandwiched between the reinforcing members 33*c* and 33*c* are directions in which the first seal member 31 and the second seal member 32 are superposed with the third seal member 33. One end of the side face of seal body 33*a* is formed with a lip part 33*b* so as to project from the reinforcing members 33c and 33c. The reinforcing members 31c, 32c, and 33c are, for example, press formed steel sheets.

Further, as shown in FIG. 4A, the cross-sectional shapes of the first seal member 31, the second seal member 32, and the third seal member 33 are U-shapes which have cutaway parts which match the cross-sectional shape of the guide rail 10. The reinforcing members 31c, 32c, and 33c form U-shapes which have a predetermined clearance with respect to parts of the cross-sectional peripheral edges of the guide rail 10, while the cross-sectional shapes of the lip parts 31b, 32b, and 33b which slide against the cross-sectional peripheral edges of the guide rail 10 are formed with cutaway parts smaller than the cutaway parts of the reinforcing members 31c, 32c, and 33c. That is, the lip parts 31b, 32b, and 33b are formed to project inward from the cutaway parts of the reinforcing members 31c, 32c, and 33c when superposed with the reinforcing members 31c, 32c, and 33c. The inner circumferential parts are used as seal surfaces which slide against the guide rail 10.

Note that, the lip parts 31b, 32b, and 33b of the first seal member 31, the second seal member 32, and the third seal member 33 may be made of the same or different materials from each other.

Here, each end cap 20b at which the seal member 30 including the seal members 31, 32, and 33 is attached is provided with positioning-use engagement pieces 20c at the surface where the seal member 30 is to be attached. The engagement pieces 20c, for example, form cylindrical shapes. A plurality are provided, projecting in the direction in which the seal member 30 is to be attached, near the tap holes 20d, 20d of the end cap 20b which communicate with tap holes 25 of the slider body 20a.

On the other hand, the reinforcing members 31c, 32c, and 33c which form the seal members 31, 32, and 33 are formed with engagement holes 31d, 32d, and 33d which engage with the engagement pieces 20c (see FIG. 4A) . Among these, the engagement hole 31d will be specifically explained with reference to FIG. 4B. As explained above, the first seal member 31 including the seal body 31a and the reinforcing members 31c and 31c. Among these, the reinforcing members 31c and 31c are formed with engagement holes 31d to be engaged with engagement pieces 20c in accordance with the positions of the engagement pieces 20c when the first seal member 31 is attached to an end cap 20b. That is, the engagement holes 31d are formed at the reinforcing members 31c, 31c produced by the same specifications. Further, the engagement holes 31d may also pass through the reinforcing members 31c.

In this way, the reinforcing members 31c and 31c which form the first seal member 31 are respectively formed with engagement holes 31d which engage with engagement pieces 20c by the same specifications, so by just changing the directions of the seal members 31, 32, and 33, it is possible to change the directions of the lip parts 31b, 32b, and 33b. That is, at the seal members 31, 32, and 33, the pair of reinforcing members 31c, 32c, 33c arranged at the two outer sides of each are the same in specifications, so by just turning the seal members 31, 32, and 33 around, it is possible to easily change from the mode shown in FIG. 3 to the later explained mode shown in FIG. 5.

Further, as shown in FIG. 3A, each seal member 30 used in the present embodiment has the first seal member 31, the second seal member 32, and the third seal member 33 with their respective lip parts 31b, 32b, and 33b all bent outward so as to contact the cross-sectional peripheral edges of the guide rail 10. By having the lip parts 31b, 32b, and 33b bent in a direction away from the slider body 20a in contacting the cross-sectional peripheral edges of the guide rail 10 in this way, it is possible to prevent entry of foreign matter to the inside of the slider 20.

Further, as shown in FIG. 3A, in the seal member 30 used in the present embodiment, when the first seal member 31, the second seal member 32, and the third seal member 33 are arranged from the slider body 20a outward in that order, the lengths of the projecting parts of the lip parts 31b, 32b, and 33b of the first seal member 31, the second seal member 32, and the third seal member 33 become shorter the more toward the outside. That is, like in the present embodiment, in the state where seal members are superposed with the projecting parts of the lip parts facing outward, the seal member is arranged so that the lengths of the projecting parts of the lip parts become shorter the more toward the outside. By employing such a configuration, it is possible to prevent entry of foreign matter to the inside of the slider 20 and adjust the frictional force.

Specifically, as shown in FIG. 3B, when designating the length from the bottom surface 31d of the reinforcing member 31c to the front end part of the lip part 31b as "d1", designating the length from the bottom surface 32d of the reinforcing member 32c to the front end part of the lip part 32b as "d2", and designating the length from the bottom surface 33d of the reinforcing member 33c to the front end part of the lip part 33b as "d3", the lengths are preferably d1>d2>d3. By making the lengths of the lip parts 31b, 32b, and 33b different in this way, even if the third seal member 33 cannot prevent the entry of foreign matter, the second seal member 32 which is superposed with the third seal member 33 and which has a the length d2 of the lip part 32b which is longer relative to the length d3 of the lip part 33b of the third seal member 33 can prevent entry of foreign matter. Furthermore, even if the second seal member 32 cannot prevent the entry of foreign matter, the first seal member 31 which is superposed with the second seal member 32 and which has a length d1 of the lip part 31b longer relative to the length d2 of the lip part 32b of the second seal member 32 can prevent entry of foreign matter. Therefore, it is possible to efficiently prevent the entry of foreign matter to the inside of the slider 20 without increasing the cost.

Further, the amount of elastic deformation of the lip parts 31b, 32b, and 33b with respect to the guide rail 10 (interference) is not particularly limited so long as being 0 mm or more and is suitably set in accordance with the object. As the specific amount of elastic deformation of the lip parts 31b, 32b, and 33b (interference), for example, 0 mm to 0.4 mm is preferable.

Furthermore, among the lip parts 31b, 32b, and 33b, the shortest lip part 33b has a length d3 set somewhat longer than the dimension D of the clearance between the guide rail 10 and the slider 20. Therefore, the lip parts 31b and 32b formed longer than the lip part 33b contact the guide rail 10 shown by the imaginary line in FIG. 3A by a high pressure.

The linear guide bearing device 1 of the present embodiment configured in this way provides the plurality of the seal members 31, 32, and 33 with different lengths of the projecting parts of the lip parts 31b, 32b, and 33b at each end part of the slider 20 in the axial direction, so it is possible to efficiently prevent the entry of foreign matter to the inside of the slider 20 without causing an increase in the cost. Further, the seal members 31, 32, and 33 are provided with the lip parts 31b, 32b, and 33b facing outward in direction (direction away from the slider body 20a), so entry of foreign matter to the inside of the slider 20 can be prevented.

Therefore, it is possible to provide a linear guide bearing device 1 which prevents the entry of foreign matter to the inside of the slider 20 and reduces the manufacturing cost without changing the materials of the seal members 31, 32, and 33.

Further, the seal members 31, 32, and 33 are constituted by the seal bodies 31*a*, 32*a*, 33*a* sandwiched between pairs of reinforcing members 31*c*, 31*c*, 32*c*, 32*c*, and 33*c*, 33*c*, so can be turned around and attached to the slider 20. Therefore, there is no need to prepare seal members which differ only in directions of bending of the lip parts for the surfaces where they are to be attached, so it is possible to reduce the manufacturing costs.

(Second Embodiment)

Figure 5:
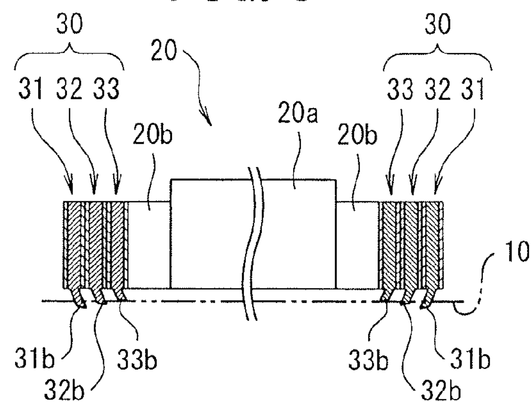
FIG. 5 is a cross-sectional view of principal parts of the configuration of a second embodiment of a linear guide bearing device.

Hereinafter, a second embodiment of the present invention will be explained with reference to the drawings. The linear guide bearing device according to the present embodiment only differs from the above-mentioned first embodiment in the configuration of the seal members, so the same reference numerals will be assigned as in the first embodiment and explanations of similar configurations will be omitted. FIG. 5 is a cross-sectional view of principal parts in the configuration of the second embodiment of the linear guide bearing device. As shown in FIG. 5, in the present embodiment, the respective lip parts 31*b*, 32*b*, and 33*b* of the first seal member 31, the second seal member 32, and the third seal member 33 are all bent inward in contacting the cross-sectional peripheral edges of the guide rail 10. This configuration can be realized by arranging the first seal member 31, the second seal member 32, and the third seal member 33 so that the projecting parts of the lip parts 31*b*, 32*b*, and 33*b* all bend inward. For example, this can be realized by turning around and superposing all of the first seal member 31, the second seal member 32, and the third seal member 33 in the above-mentioned first embodiment and attaching them to the slider body 20*a* (end cap 20*b*).

By arranging the seal members 31, 32, and 33 so that the lip parts 31*b*, 32*b*, and 33*b* are bent facing the slider body 20*a* in contacting the cross-sectional peripheral edges of the guide rail 10 in this way, it is possible to more reliably prevent leakage of the lubricant from the inside of the slider 20.

Further, as shown in FIG. 5A, the seal member 30 used in the present embodiment has the first seal member 31, the second seal member 32, and the third seal member 33 with lengths of the projecting parts of the lip parts 31*b*, 32*b*, and 33*b* longer the more toward the outside. That is, in a mode like in the present embodiment where the seal members are superposed with the projecting parts of the lip parts facing inward, the seal members are arranged so that the lengths of the projecting parts of the lip parts become longer, as extending further toward the outside. By employing such a configuration, it is possible to prevent leakage of lubricant from the inside of the slider 20 and adjust the frictional force.

(Third Embodiment)

Figure 6:
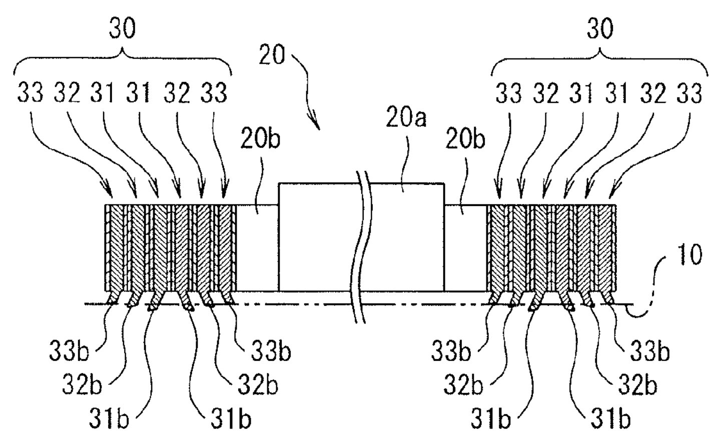
FIG. 6 is a cross-sectional view of principal parts of the configuration of a third embodiment of a linear guide bearing device.

Hereinafter, a third embodiment of the present invention will be explained with reference to the drawings. The linear guide bearing device according to the present embodiment only differs from the above-mentioned first embodiment in the configuration of the seal members, so the same reference numerals will be assigned as in the first embodiment and explanations of similar configurations will be omitted. FIG. 6 is a cross-sectional view of principal parts in the configuration of the third embodiment of the linear guide bearing device. As shown in FIG. 6, in the present embodiment, the seal members 30 provided at the two end parts of slider body 20*a* are respectively constituted by six seal members. Specifically, each arrangement of the first seal member 31 with a length of a lip part 31*b* of "d1" , the second seal member 32 with a length of a lip part 32*b* of "d2" , and the third seal member 33 with a length of a lip part 33*b* of "d3" (d1>d2>d3) is made, in the direction away from the slider body 20*a*, a third seal member 33, a second seal member 32, a first seal member 31, a first seal member 31, a second seal member 32, and a third seal member 33 superposed in that order. Further, the lip parts 33*b*, 32*b*, and 31*b* of the third seal member 33, the second seal member 32, and the first seal member 31 at a near side of the slider body 20*a* are bent inward in contacting the cross-sectional peripheral edges of the guide rail 10. On the other hand, the lip parts 31*b*, 32*b*, and 33*b* of the first seal member 31, the second seal member 32, and the third seal member 33 at a far side of the slider body 20*a* are bent outward in contacting the cross-sectional peripheral edges of the guide rail 10. This configuration can be realized, for example, by using the first seal member 31, the second seal member 32, and the third seal member 33 attached to each side of the slider 20 in the above-mentioned second embodiment and adding the first seal member 31, the second seal member 32, and the third seal member 33 attached to each side of the slider 20 in the first embodiment in that order to each further outside part.

In this way, by changing the lip parts 33*b*, 32*b*, 31*b*, 31*b*, 32*b*, and 33*b* in length and bending them with respect to the slider body 20*a* so as to change the directions of contacting the cross-sectional peripheral edges of the guide rail 10, it is possible to not only prevent entry of foreign matter to the inside of the slider 20, but also to more reliably prevent leakage of lubricant from the inside of the slider 20.

(Fourth Embodiment)

Figure 7:
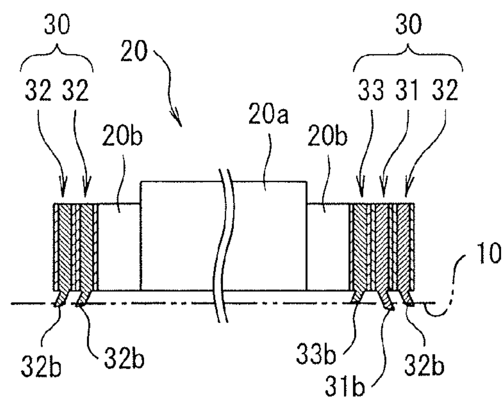
FIG. 7 is a cross-sectional view of principal parts of the configuration of a fourth embodiment of a linear guide bearing device.
Figure 8:
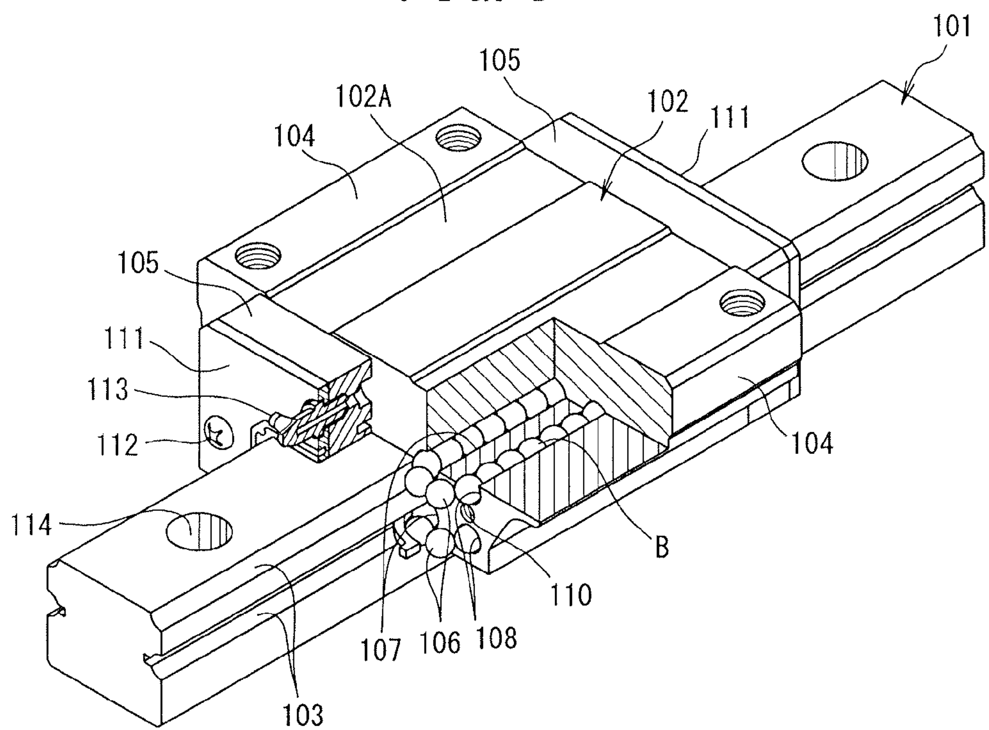
FIG. 8 is a perspective view which shows the configuration of a conventional linear guide bearing device.
Figure 9:
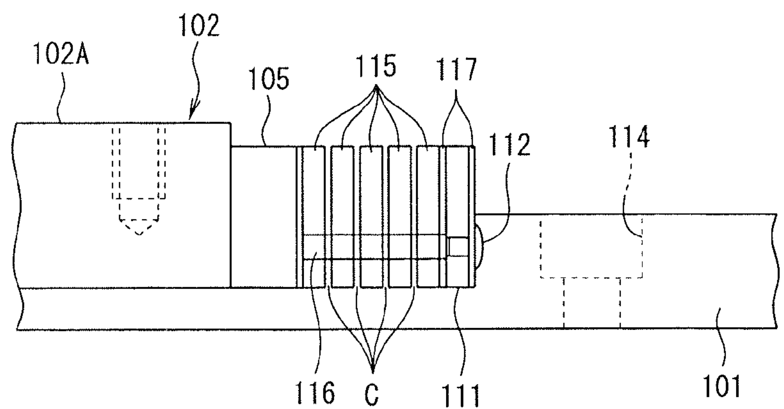
FIG. 9 is a side view which shows the configuration of a conventional linear guide bearing device.
Figure 10:
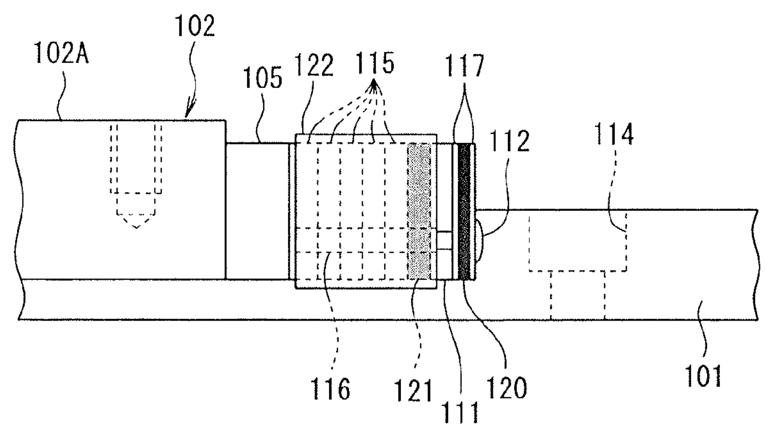
FIG. 10 is a side view which shows the configuration of a conventional linear guide bearing device.
Figure 11:
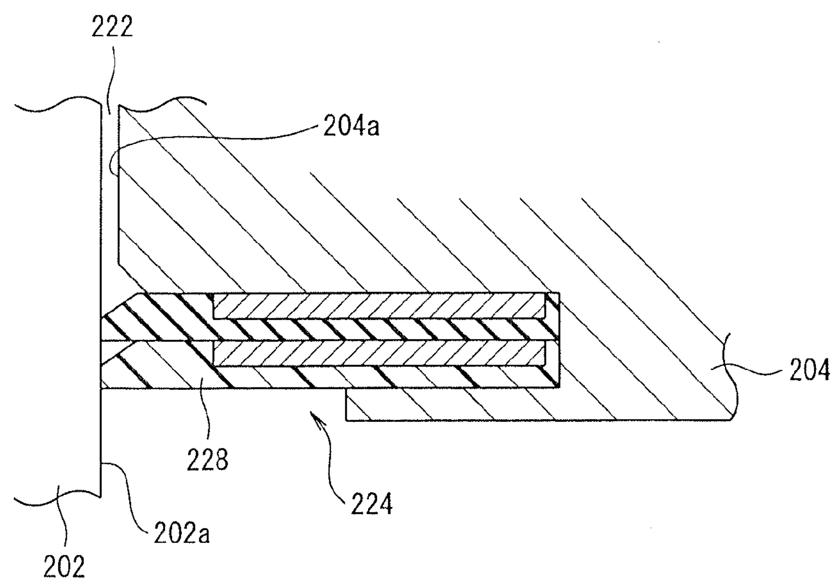
FIG. 11 is a cross-sectional view of principal parts which shows the configuration of a conventional linear guide bearing device.

Hereinafter, a fourth embodiment of the present invention will be explained with reference to the drawings. The linear guide bearing device according to the present embodiment only differs from the above-mentioned first embodiment in the configuration of the seal members, so the same reference numerals will be assigned as in the first embodiment and explanations of similar configurations will be omitted. FIG. 7 is a cross-sectional view of principal parts in the configuration of the fourth embodiment of the linear guide bearing device. As shown in FIG. 7, in the present embodiment, one of the seal members 30 provided at the two end parts of the slider body 20*a* includes two seal members 32 and 32, while the other includes three seal members 33, 31, and 32. The seal members 32 and 32 are arranged so that the directions at which the projecting lip parts are bent both are outward. Here, as shown by the same reference numerals, the seal members 32 and 32 at one end side of the slider body 20*a* are seal members of the same specifications where the lengths of the lip parts 32*b* which project are the same. Further, the other seal members 33, 31, and 32 are arranged from the inside in the order of the seal member 33 (lip part 32*b* bent inward), 31 (lip part 31*b* bent outward), and 32 (lip part 33*b* bent outward).

In this way, by configuring the seal member 30 provided at one end part of the slider body 20*a* from seal members 32 and 32 with lip parts 32*b* and 32*b* bent outward, it is in particular possible to prevent the entry of foreign matter from the sides at which the lip parts 32*b* and 32*b* bend to the inside of the slider 20. On the other hand, at the seal member 30 provided at the other end part of the slider body 20*a*, the seal members 33, 31, and 32 can not only prevent the entry of foreign matter to the inside of the slider 20, but can also more reliably prevent leakage of lubricant from the inside of the slider 20.

Note that, the linear guide bearing device and the seal member used for the same according to the present invention are not limited the above embodiments. Various modifications are possible without departing from the gist of the present invention. For example, in the above embodiment, the example where a plurality of seal members are attached superposed to one or another end part of the slider has been explained, but a single seal member may also be attached to at least one of one or the other end part of the slider. Each seal member can be changed in direction of bending of the lip part by just turning it around, so even with attachment of one, there is no need to prepare a special seal member and a reduction of cost can be realized. Further, in the above embodiment, as rolling elements, balls are used, but rollers may also be used or a slide type linear guide bearing device which does not use rolling elements may also be formed.

Reference Signs List

1 linear guide bearing device
2 conveyor device
10 guide rail
11 rolling element rolling groove (guide rail side)
20 slider
20*a* slider body
20*b* end cap
22 rolling element rolling groove (slider side)
30 seal member
31 first seal member
32 second seal member
33 third seal member
31*b* lip part
32*b* lip part
33*b* lip part
B ball (rolling element)

The invention claimed is:

1. A linear guide bearing device comprising:
a guide rail which has guide rail rolling element rolling grooves extending in an axial direction;
a slider which has slider rolling element rolling grooves facing the guide rail rolling element rolling grooves and straddling the guide rail to be capable of relatively moving in the axial direction through a rolling action of a plurality of rolling elements inserted between associated ones of the guide rail and slider rolling element rolling grooves; and
a plurality of seal members attached to each end part of the slider in the axial direction to be superposed in the axial direction of the slider,
wherein each of the plurality of seal members has a seal body provided with a lip part which slides against the guide rail rolling element rolling grooves and reinforcing members provided at both sides of the seal body, and
wherein for each of the plurality of seal members, the lip part projects from the seal body in a direction toward the slider body, with the length of respective lip parts being longer the further away from the slider body.

2. The linear guide bearing device according to claim 1, wherein for each of the plurality of seal members, the lip part projects from the seal body in a direction away from the slider body, with the length of respective lip parts being shorter the further away from the slider body.

3. The linear guide bearing device according to claim 1, wherein:
the plurality of the seal members comprise a first seal member, a second seal member, and a third seal member, each having the lip part, and lengths of the lip parts have a relationship such that the length of the lip part of the first seal member is greater than the length of the lip part of the second seal member which is greater than the length of the lip part of the third seal member,
at each end of the slider body, two of each of the first, second and third seal members are arranged with a superposed order in a direction away from the slider body as follows: the third seal member, the second seal member, the first seal member, the first seal member, the second seal member, and the third seal member,
the lip parts of the third seal member, the second seal member, and the first seal member on a near side of the slider body are respectively bent inward, and
the lip parts of the first seal member, the second seal member, and the third seal member on a far side of the slider body are respectively bent outward.

4. The linear guide bearing device according to claim 1, wherein:
the plurality of the seal members are selected from a group comprising a first seal member, a second seal member, and a third seal member, each having the lip part, and lengths of the lip parts have a relationship such that the length of the lip part of the first seal member is greater than the length of the lip part of the second seal member which is greater than the length of the lip part of the third seal member,
two of the second seal members being provided at one end part in the axial direction of the slider, and one each of the third seal member, the first seal member, and the second seal member being provided at the other end part in the axial direction of the slider,
the lip parts of the two second seal members at the one end part in the axial direction of the slider are superposed and are both bent outward, and
the three seal members at the other end part in the axial direction of the slider are superposed such that the lip part of the third seal member is bent inward, the lip part of the first seal member is bent outward, and the lip part of the second seal member is bent outward.

* * * * *